(12) United States Patent
Tenberge et al.

(10) Patent No.: US 11,414,156 B2
(45) Date of Patent: Aug. 16, 2022

(54) DRIVE SYSTEM

(71) Applicant: Brose Antriebstechnik GmbH & Co. Kommanditgesellschaft, Berlin, Berlin (DE)

(72) Inventors: Peter Tenberge, Bochum (DE); Mick Jordan, Bochum (DE)

(73) Assignee: Brose Antriebstechnik GmbH & Co. Kommanditgesellschaft, Berlin, Berlin (DE)

( * ) Notice: Subject to any disclaimer, the term of this patent is extended or adjusted under 35 U.S.C. 154(b) by 42 days.

(21) Appl. No.: 16/978,207

(22) PCT Filed: Mar. 7, 2019

(86) PCT No.: PCT/EP2019/055734
§ 371 (c)(1),
(2) Date: Sep. 4, 2020

(87) PCT Pub. No.: WO2019/175022
PCT Pub. Date: Sep. 19, 2019

(65) Prior Publication Data
US 2021/0039746 A1 Feb. 11, 2021

(30) Foreign Application Priority Data
Mar. 6, 2018 (DE) .................... 10 2018 001 795.9

(51) Int. Cl.
*B62M 6/55* (2010.01)
*F16H 3/72* (2006.01)
(Continued)

(52) U.S. Cl.
CPC ............. *B62M 6/55* (2013.01); *F16H 3/724* (2013.01); *B60L 2240/421* (2013.01);
(Continued)

(58) Field of Classification Search
CPC . B62M 6/55; B62M 6/50; B62M 1/36; B62M 11/14; B62M 11/145; B62M 23/02; B60L 2220/44; F16H 3/724
(Continued)

(56) References Cited

U.S. PATENT DOCUMENTS 1,515,321 A 11/1924 Ahlm et al.
3,623,568 A 11/1971 Mori
(Continued)

FOREIGN PATENT DOCUMENTS

DE 3147447 A1 6/1983
DE 19925229 A1 1/2000
(Continued)

*Primary Examiner* — Anne Marie M Boehler
(74) *Attorney, Agent, or Firm* — Brooks Kushman PC

(57) ABSTRACT

A drive system, wherein: a drive shaft and an output shaft as well as a second motor, to-gether with the second rotor shaft thereof, are arranged coaxially in a first shafting; a multi-stage cross-drive steering transmission of the drive system, together with a sun gear, a ring gear and a planetary carrier, is designed solely as a three-shaft planetary gear stage, which is arranged in a second shafting parallel to the first shafting; and a first motor is arranged in a third shafting together with the first rotor shaft thereof, said third shafting being parallel to the first shafting and to the second shafting.

17 Claims, 4 Drawing Sheets

(51) Int. Cl.
*B62M 6/45* (2010.01)
*B62M 11/14* (2006.01)

(52) U.S. Cl.
CPC ............ *B60Y 2200/13* (2013.01); *B62M 6/45* (2013.01); *B62M 11/145* (2013.01)

(58) Field of Classification Search
USPC .............................................. 180/206.4, 69.6
See application file for complete search history.

(56) References Cited

U.S. PATENT DOCUMENTS

| | | | |
|---|---|---|---|
| 5,151,321 | A | 9/1992 | Reeves et al. |
| 9,254,890 | B2 | 2/2016 | Deleval |
| 9,302,734 | B2 * | 4/2016 | Getta ................... B62M 11/145 |
| 11,091,225 | B2 * | 8/2021 | Deleval ................... B62M 6/55 |
| 2012/0010036 | A1 * | 1/2012 | Moeller ................... B62M 6/55 |
| | | | 475/149 |
| 2015/0122565 | A1 * | 5/2015 | Deleval ................... B62M 6/50 |
| | | | 180/206.3 |
| 2017/0137087 | A1 * | 5/2017 | Watarai ................... B62M 11/02 |
| 2017/0152002 | A1 * | 6/2017 | Yamamoto ................ F16H 3/54 |
| 2017/0259883 | A1 | 9/2017 | Yamamoto |
| 2017/0291660 | A1 * | 10/2017 | Deleval ................... B62M 6/50 |
| 2020/0198727 | A1 * | 6/2020 | Deleval ................... B62M 6/50 |

FOREIGN PATENT DOCUMENTS

| | | | | |
|---|---|---|---|---|
| DE | 102017200611 | A1 | | 8/2017 |
| DE | 102016014410 | | * 1/2018 | ............. B62M 6/55 |
| EP | 2218634 | A1 | | 8/2010 |
| WO | 2016034574 | A1 | | 3/2016 |

* cited by examiner

DRIVE SYSTEM

CROSS-REFERENCE TO RELATED APPLICATIONS

This application is the U.S. National Phase of PCT Application No. PCT/EP2019/055734 filed on Mar. 7, 2019, which claims priority to German Patent Application No. DE 10 2018 001 795.9, filed on Mar. 6, 2018, the disclosures of which are hereby incorporated in their entirety by reference herein.

TECHNICAL FIELD

The present disclosure relates to a drive system in a transmission for an electric bicycle.

BACKGROUND

Electric bicycles or e-bikes may include an electric motor that may provide assistance to a user to reduce effort required by the user to power the bicycle. The electric motor may be coupled to a gear system or transmission to allow for variable torque and speed for different circumstances or conditions.

SUMMARY

According to one or more embodiments, a drive for use in a bicycle is provided. The drive may have a compact design and in a radial direction the drive may be relatively short as possible, such as at the first shaft train. The arrangement of the planetary gear stage on the second shaft train parallel to the first shaft train with coaxial input and output allows a small sun gear diameter. Even with advantageously large negative stationary transmission ratios in the three-shaft planetary gear stage, the ring gear diameter then remains small even without the use of expensive stepped planets.

According to one or more embodiments, the input shaft and the output shaft and the second motor with its second rotor shaft are arranged coaxially on a first shaft train, and the multistage superposition transmission has only a three-shaft planetary gear stage with the sun gear, the ring gear and the planet carrier, which stage is arranged on a second shaft train which is situated parallel to the first shaft train. Furthermore, the first motor with its first rotor shaft is arranged on a third shaft train which is situated parallel to the first shaft train and to the second shaft train.

In an exemplary embodiment of a proposed drive system, a large-magnitude stationary transmission ratio of more than |−4| is achieved, for example. In the exemplary embodiment, the drive system can be configured and designed in such a way that, via a (first) transmission stage, the rotational speed of the input shaft is increased by an approximately three times larger absolute rotational speed of the first coupling shaft, which is connected via the planetary gear stage to the second coupling shaft, and/or in such a way that a rotational speed of the second coupling shaft is converted via a (second) transmission stage to an approximately 30% smaller rotational speed of the output shaft.

The axial offset between the first shaft train and the second shaft train may increase the rotational speed between the very slow-running input shaft in a bicycle application and the planetary gear stage, with the result that the maximum torque loading and hence the overall size of the planetary gear stage decreases further. This also then results in a reduction in the required transmission ratios between the planetary gear stage then rotating at medium speed and the quickly rotating small rotors in the continuously variable actuating mechanism.

In a further embodiment, there is provision that a) the input shaft on the first shaft train is connected via a first spur gear stage to a first coupling shaft on the second shaft train, b) the output shaft on the first shaft train is connected via a second spur gear stage to a second coupling shaft on the second shaft train, c) the second rotor shaft of the second motor on the first shaft train is connected via a third spur gear stage to a third coupling shaft on the second shaft train, which coupling shaft is connected to the sun gear, and d) the first rotor shaft of the first motor on the third shaft train is connected via a fourth spur gear stage to the ring gear on the second shaft train.

In one or more embodiments, the first spur gear stage increases the rotational speed of the input shaft to an approximately three times larger absolute rotational speed of the first coupling shaft, which is connected to a second coupling shaft via the planetary gear stage. The rotational speed of the second coupling shaft is converted, with the transmission ratio of the second spur gear stage, to the rotational speed of the output shaft. The ratio of the transmission ratios of the first spur gear stage and the second spur gear stage, each defined as a ratio of the rotational speed of the gear on the second shaft train to the rotational speed of the gear on the first shaft train, here defines the maximum actuating coupling transmission ratio between the first coupling shaft and the second coupling shaft which, depending on the embodiment variant of the proposed drive system, are connected to other elements of the planetary gear stage.

According to another embodiment, on the second shaft train, the first coupling shaft is connected to the planet carrier and the second coupling shaft is connected to the ring gear of the planetary gear stage. Alternatively, on the second shaft train, the first coupling shaft is connected to the ring gear and the second coupling shaft is connected to the planet carrier. Since the first rotor shaft of the first motor in the aforementioned first embodiment variant is always connected to the ring gear, the first embodiment variant has output-side power branching. By contrast, the above-described second embodiment variant has input-side power branching.

In one or more embodiments, the radial arrangement of the planetary gear stage between the rotor shafts of the two motors is combined with an axial arrangement of the transmission stages to form an overall extremely compact arrangement. For this purpose, five arrangement planes are defined. The second spur gear stage is then situated for example in a first arrangement plane, and the planetary gear stage and the fourth spur gear stage are situated in a second arrangement plane which is situated offset parallel to the first arrangement plane in an axial direction which points into the from an output, which projects from the transmission housing, of the output shaft. The first spur gear stage is situated in a third arrangement plane which is likewise situated offset in the axial direction with respect to the second arrangement plane, and the third spur gear stage is situated in a fourth arrangement plane which is also situated offset in the axial direction with respect to the third arrangement plane. The two motors are in turn situated in a fifth arrangement plane which is likewise situated offset in the axial direction with respect to the fourth arrangement plane.

In order, with the aim of a short axial overall length, to require no further arrangement planes, there can be provision that a gear of the fourth spur gear stage on the second shaft train has a larger pitch circle radius than the ring gear of the three-shaft planetary gear stage. As a result, the ring gear is located within this gear of the fourth spur gear stage in the second arrangement plane.

In order to further assist simple assembly and mounting, the gear of the first spur gear stage on the first coupling shaft can have a larger pitch circle radius than the sun gear on the third coupling shaft. Consequently, upon assembly of the drive system, the sun gear can be plugged through the gear on the first coupling shaft.

For simple assembly of the remaining elements of the drive system and mounting thereof in the transmission housing, the transmission housing can be of multipart design and have, for example, four housing parts. Thus, the transmission housing can have a main housing with a central web (possibly releasably connected to the main housing), a motor covering connected to the main housing, and a transmission covering connected to the main housing. With reference to the above-explained arrangement planes, the motor covering can be provided for example on one side of the transmission housing on the fifth arrangement plane, and the transmission covering can be provided on one side of the transmission housing on the first arrangement plane through which the output shaft projects out of the transmission housing.

For low-noise and low-loss running of all the shafts in a drive system, there are advantageously provided statically determined bearing arrangements of all shafts in the transmission housing or on other shafts in bearings which are as small as possible and which have a sufficiently large bearing spacing.

The input shaft can be supported via a first bearing in the output shaft and via a second bearing in the motor covering. The output shaft can in turn be supported via a third bearing in the transmission covering and via a fourth bearing on the input shaft. In principle, the input shaft can project on both sides from the transmission housing.

In one exemplary embodiment, the first rotor shaft is supported via a fifth bearing in the transmission covering and via a sixth bearing in the central web or in the motor covering.

In a further embodiment of the bearing arrangements, the second rotor shaft is mounted via a seventh bearing on the input shaft or in the central web and via an eighth bearing on the input shaft or in the motor covering.

With regard to the bearing arrangements of the coupling shafts on the second shaft train, there is provision for example that a) the second coupling shaft on the second shaft train is mounted via a ninth bearing in the transmission covering and via a tenth bearing in the central web or in the motor covering, b) the third coupling shaft is supported via an eleventh bearing on the second coupling shaft and via a twelfth bearing in the central web, c) the first coupling shaft is supported via a thirteenth bearing on the third coupling shaft and via a fourteenth bearing on the second coupling shaft, d) a fifteenth bearing transmits axial forces between the third coupling shaft and the central web, and e) a sixteenth bearing transmits axial forces between the first coupling shaft and the third coupling shaft.

For a purely mechanical basic function with a maximum transmission ratio in the drive system between the rotational speed of the input shaft and the rotational speed of the output shaft, there can be provision that a freewheel between the input shaft and the output shaft that prevents the input shaft from rotating quicker than the output shaft is seated between the first bearing and the fourth bearing. For the application of the drive system according to the invention in a bicycle, it is then possible, even in the case of a total failure of the electrical system or of the controller, for the rider to continue to ride at lower speed and maximum transmission ratio even in difficult terrain.

For precise and reliable control of the drive system with a high degree of drive comfort, the controller requires precise signals in short clock times. For this purpose, according to one exemplary embodiment, there is provision for example that a first resolver with sensor and encoder wheel for (exactly) measuring an angular position and a rotational speed is seated on the first rotor shaft, and/or that a second resolver with sensor and encoder wheel for (exactly) measuring an angular position and a rotational speed is seated on the second rotor shaft, and/or that a rotational speed measuring system is seated on the input shaft, and/or that an acceleration sensor and/or an inclination sensor are/is seated on the transmission housing.

High-precision resolvers allow, for example, exact rotational speed and/or torque controls on the two motors, depending on the mode of operation of the drive system. An additional (optional) rotational speed measuring system can allow a certain redundancy for higher system reliability on the input shaft. The acceleration and inclination signals of one or more sensors, in conjunction with the knowledge of the transmitted power, allow conclusions to be drawn on the system weight and the dynamics of the input torque. This information can be used in the power controller for quicker and more comfortable control.

In principle, the proposed solution is not limited to the details described above and those to be described below, but also extends to equivalent solutions, examples being that a spur gear transmission stage can be replaced by a toothed-belt transmission stage, a ball bearing for coupled support of radial and axial forces can be replaced by a combination of a pure radial bearing and an axial bearing, and/or a rolling bearing can be replaced by a sliding bearing.

BRIEF DESCRIPTION OF THE DRAWINGS

The appended figures illustrate by way of example possible embodiment variants of the proposed solution.

In the figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
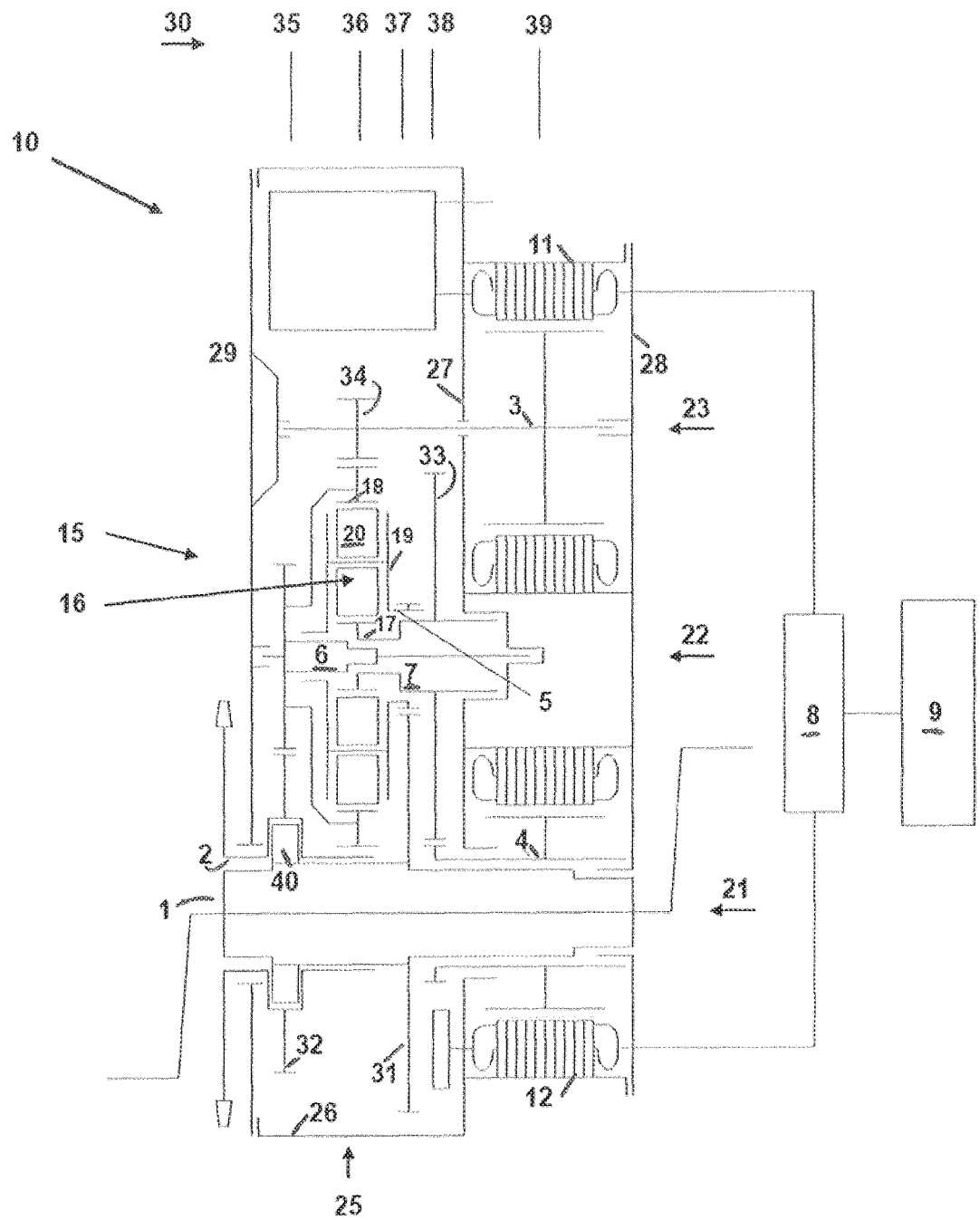
FIG. 1 shows a transmission structure with output-side power branching according to a first embodiment variant of a proposed drive system for application in an electrically assisted bicycle.

A drive system is known here from DE 199 25 229 A1. In FIG. 1 of this document, an input shaft 127 and an output shaft 114 are coupled via a multistage superposition transmission which has a three-shaft planetary gear stage 120 with a sun gear 121, a ring gear 122 and a planet carrier 124 with a plurality of planet gears 123. The output shaft 114 is connected to the ring gear 122 by means of a multistage sub-transmission with constant transmission ratio. The input shaft 127 is connected to the planet carrier 124. The first rotor shaft 132 of a first motor, which is an electric motor here, is connected to the sun gear 121, and the second rotor shaft of a second motor, which is likewise an electric motor here, is, like the output shaft 114, connected to the ring gear 122. The two motors are coupled via a power controller to form a continuously variable actuating mechanism and are connected here to a battery as energy accumulator. Continuously varying the transmission ratio in the actuating mechanism also results in a continuous variation of the ratio of input rotational speed to output rotational speed. By skillfully designing such a drive system, only a small part of the drive power flows via the actuating mechanism with rather low efficiency and the total efficiency of the drive system increases.

Drive systems of this type with an electric or hydraulic motor which is connected to the output shaft are also described in the prior art as coupling mechanisms with output-side power branching. By contrast thereto, drive systems of this type with an electric or hydraulic motor which is connected to the input shaft are also described as coupling mechanisms with input-side power branching.

DE 31 47 447 A1 thus describes a drive system with input-side power branching. In FIG. 1 of this document, an input shaft 1 and an output shaft 2 are connected via a multistage superposition transmission to the first rotor shaft of a first hydraulic motor a and to the second rotor shaft of a second hydraulic motor b. The two hydraulic motors a and b are connected via a power controller, which is not illustrated in this FIG. 1 but is known from the prior art, to form a continuously variable actuating mechanism which, also according to the prior art, can be attached to a pressure accumulator as energy accumulator. In this document, the multistage superposition transmission also includes a planetary gear stage I with a sun gear 1', a ring gear 2' and a planet carrier s with a plurality of planet gears p'. The planet carrier s can be connected to the output shaft 2 via a plurality of shiftable transmission stages. The multistage superposition transmission also includes a further planetary gear stage II with a sun gear 1'', a ring gear 2'' and a planet carrier s' with a plurality of planet gears p''. The ring gear 2'' can likewise be connected to the output shaft 2 via further shiftable transmission stages. The input shaft 1 is connected via a transmission stage to the first hydraulic motor a and to the ring gear 2' and the planet carrier s'. Drive systems according to this document are used in drives of construction machines and agricultural tractors.

The drive system according to DE 31 47 447 A1 is substantially more complex than the drive system according to DE 199 25 229 A1. The reason for this is that the many shiftable gears allow a design in which the power fraction which flows via the continuously variable actuating mechanism becomes smaller as the number of gears increases. Consequently, such a drive system manages even at very large input and output torques with small motors in the actuating mechanism.

A drive system according to the preamble with electric motors is already known from U.S. Pat. No. 1,515,321 A as "Electromagnetic Transmission Mechanism". According to FIG. 1 of this document, the drive system is located in a housing 84 and is situated between an input shaft 10, which is connected to an input flange 11, and an output shaft 12. The input shaft 10 and the output shaft 12 are connected via a multistage superposition transmission to a first rotor shaft 47 of a first electric motor 20 and to a second rotor shaft 44 of a second electric motor 25. The first rotor shaft 47 is fixedly connected to the input shaft 10, and therefore drive-side power branching is consumed here.

The multistage superposition transmission consists of two coupled planetary gear stages each having a sun gear, a ring gear and a planet carrier, wherein the planet carriers are fixedly connected to one another and some planet gears are coupled to form so-called stepped planets. The input shaft 10 is connected to the sun gear 53 of the first planetary gear stage. The output shaft 12 is connected to the ring gear of this planetary gear stage. The second electric motor 25 acts on the common planet carrier via the sun gear 62 of the second planetary gear stage.

U.S. Pat. No. 3,623,568 A also describes a drive system according to the preamble with two electric motors. In FIG. 1 of this document, the input shaft 10 is connected to the planet carrier 20 of a planetary gear stage of the superposition system, a first electric motor 15 is connected to the ring gear 22, and a second electric motor 12 acts between the sun gear 21 and the ring gear 22. The output shaft 11 is also connected to the ring gear 22. This drive system also has two rotational speed sensors. A first rotational speed sensor 30 measures the rotational speed of the input shaft 10, which is equal to the rotational speed of the planet carrier 20. A second rotational speed sensor 31 measures the rotational speed of the output shaft 11, which is equal to the rotational speed of the ring gear 22. Through the kinematic fundamental relationship of three-shaft planetary gear stages the rotational speed of the sun gear is thus also fixed. According to the prior art, such rotational speed sensors also detect at least one reference angle per revolution, with these reference angles and the integrated rotational speed signals giving the exact angular positions of the remaining shafts in the drive system. This is important for the precise control of the phase currents in the two electric motors. The time derivatives of the rotational speed signals then drive the rotational accelerations in the system as reactions to the external torques.

A drive system for a bicycle includes a multistage, usually mechanical transmission between an input shaft and an output shaft. The drive systems for electrically assisted bicycles additionally have an electric motor which assists the driver as main drive unit as required. Since the market success of hybrid drives which, for example, use the drive system according to DE 199 25 229 A1, there have been considerations of a continuously variable electrically power-branched drive system for bicycles. Such developments have been suggested more strongly still through the market success of electrically assisted bicycles.

U.S. Pat. No. 9,254,890 B2 describes a drive system according to the preamble with two electric motors for an application in bicycles. A very detailed arrangement of the elements of the drive system emerges from FIG. 19 of this document. The drive system is seated in a transmission housing between an input shaft 111 and an output shaft 123 arranged coaxially thereto. As customary in bicycle applications, the input shaft 111 passes through the drive system in the axial direction to allow drive cranks to be mounted at both ends. The multistage superposition transmission includes a planetary gear stage with a sun gear 113, a ring gear 112' and a planet carrier 114 with a plurality of planet gears 115 which are also configured here as stepped planets, of which the larger steps match with the sun gear 113 and the smaller steps with the ring gear 112'. The input shaft 111 is connected via a transmission stage to a first electric motor 104 and the ring gear 112. The sun gear 113 is directly and coaxially connected to a second electric motor 105. The output shaft 123 is connected to the planet carrier. This arrangement thus concerns input-side power branching.

Given the small available axial length of the drive system, the high torque on the sun gear requires a large air gap diameter at the second electric motor 105. This motor is therefore designed as an external rotor motor. Radially outside the second electric motor 105, the first electric motor 104 is seated on an axis parallel to the input shaft. This motor is conventionally designed with an external stator. On account of its small maximum torque, it requires a large transmission ratio to the ring gear of the planetary gear stage. Here, this transmission ratio is configured with respect to the limited axial installation space by means of only one transmission stage, thus leading to a very large gear 112. In a bicycle application, this disadvantageously reduces the distance of the transmission case from the roadway and from the rear wheel. A large part of the axial installation space is used in this drive system for the stepped planets of the planetary gear stage. However, these stepped planets are required here in order to achieve a sufficiently large stationary transmission ratio between the relatively large sun gear and the ring gear. In this configuration, the sun gear has to be so large because both the input shaft and output shaft pass through the sun gear. In addition, stepped planets require not only a lot of axial installation space but are also expensive to manufacture and assemble and, at the small step, difficult to mount.

Finally, EP 2 218 634 B1 also describes a further drive system according to the preamble with two electric motors for an application in bicycles. The single figure of this document presents the crucial features of this drive system. The drive system is again seated between an input shaft 2 and an output shaft 32 arranged coaxially thereto. The input shaft 2 again passes through the drive system in the axial direction. The superposition system again includes a three-shaft planetary gear stage with a sun gear on a sun gear shaft 18, a ring gear on a ring gear shaft 20, and a planet carrier 20 with a plurality of simple planet gears 16. The planet carrier 12 is connected to the input shaft 2 for conjoint rotation. The sun gear shaft 18 is connected via a first transmission stage to the rotor shaft 26 of a first electric motor 22. The ring gear shaft 20 is connected via a second transmission stage to the rotor shaft 28 of a second electric motor 24 and to the output shaft. What is concerned here is thus again output-side power branching. The two electric motors 22 and 24 are connected to one another via a power controller 30 and to a battery 31.

On account of the small maximum torques of the two electric motors 22 and 24, there are here required then transmission stages with large transmission ratios between the rotor shafts 26 and 28 and the associated connection shafts 18 and 20 to the planetary gear stage. This also leads here to disadvantageously large gearwheels coaxially to the input shaft and hence to a large radial installation space around the input shaft.

Against the background of the prior art, there continues to exist a need for an improved drive system, such as a drive system which is configured and provided for use on a bicycle.

Compared to previously known solutions, the proposed drive system can here, for example for the use in a bicycle, afford improvements with respect to installation space, weight, power flows and efficiency and here takes account of different requirements, such as for example that the planetary gear stage requires a large stationary transmission ratio but is intended to be axially and radially small in construction and therefore not have expensive stepped planets; the transmission stages used are not intended to have large transmission ratios for which large tooth wheels with large radial dimensions are necessary; all the elements of the drive system are intended to be arranged to be nested inside one another as far as possible such that a minimum axial and radial overall length results, a ground clearance between the housing of the drive system and a roadway is intended to be maximum, and the input shaft should pass through the drive system as far as possible and be situated coaxially to the output shaft.

Figure 2:
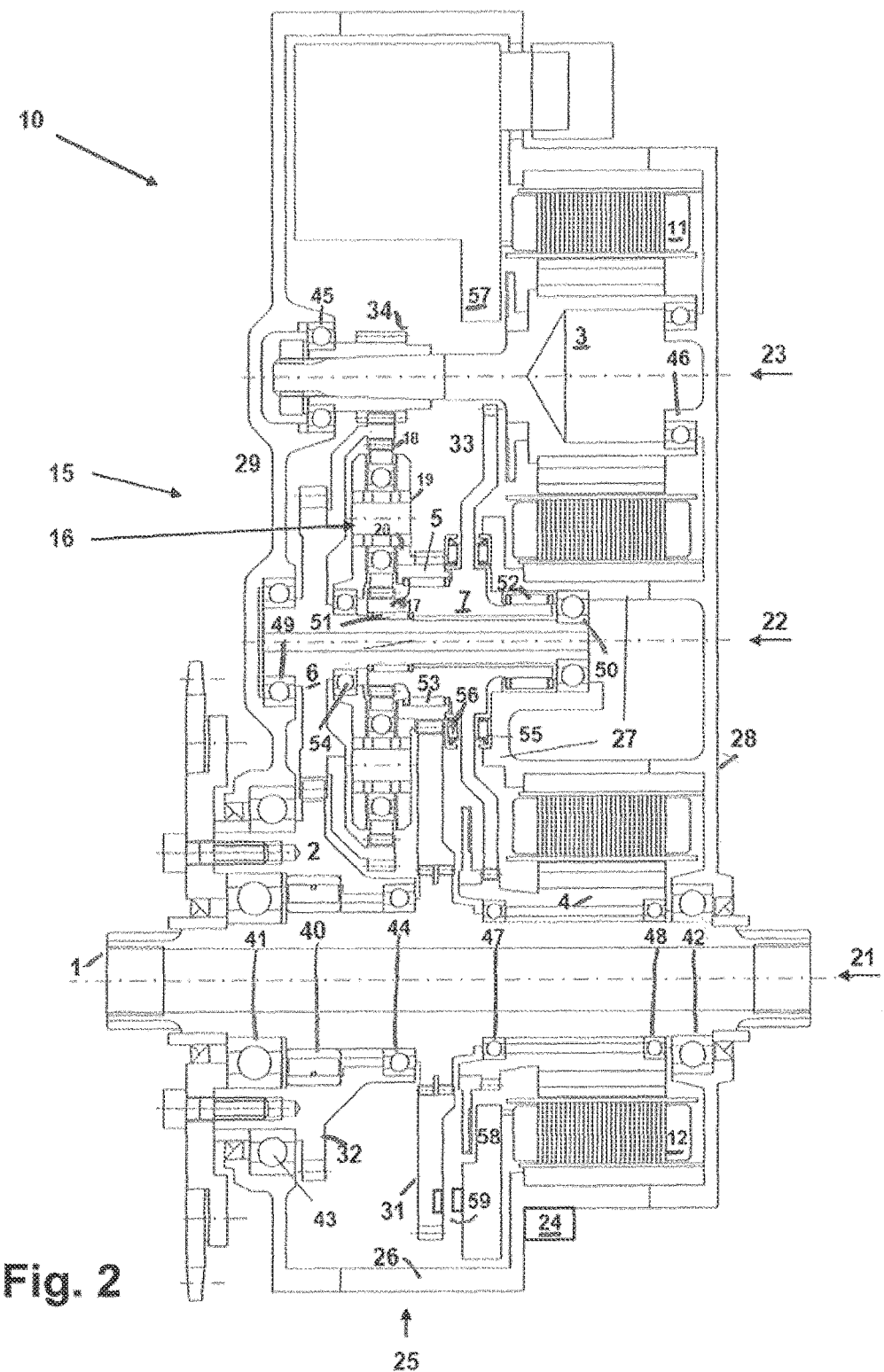
FIG. 2 shows a constructive design of the drive system according to FIG. 1 for illustrating the relative positions of mechanical components such as shafts, transmission stages and bearing arrangements with respect to one another.

FIGS. 1 and 2 show the transmission structure and a 2D construction design of a first embodiment variant of the drive system 10 according to the invention between the input shaft 1 and the output shaft 2 in a transmission housing 25 for application in an electrically assisted bicycle. The input shaft 1 passes through the transmission housing 25 and is connected on each side to a crank via which the rider drives the drive system 10. The output shaft 2 projects from the transmission housing 25 only on one side and is connected to a chainwheel or a toothed-belt pulley in order from there to drive the rear wheel of the bicycle.

The drive system 10 has a first motor 11 with a first rotor shaft 3. The motor is configured as an electric motor in this application. The drive system 10 also has a second motor 12 with a second rotor shaft 4. The second motor is also configured as an electric motor in this application. The two electric motors 11 and 12 are connected via a power controller 8 and thus form a continuously variable electric actuating mechanism. The power controller 8 is also connected to an energy accumulator 9 in the form of a battery. Consequently, the output shaft 2 can also be purely electrically driven via the first electric motor 11. The energy accumulator 9 can then also be used as a brake energy accumulator when braking power flows into the drive system 10 at the output shaft 2.

The input shaft 1, the output shaft 2 and the two rotor shafts 3 and 4 are coupled via a multistage superposition transmission 15 which has a plurality of transmission stages with 1 degree of freedom and at least one planetary gear stage 16 with 2 degrees of freedom. The transmission stages are configured here as spur gear stages. However, toothed-belt transmission stages are also conceivable. The three-shaft planetary gear stage 16 has a sun gear 17, a ring gear 18 and a planet carrier 19 with a plurality of planet gears 20 which are mounted on planet gear bolts.

The elements of the drive system 10 are situated so as to be distributed on three shaft trains 21, 22 and 23 which are all arranged parallel to one another in the available installation space of the transmission housing 25.

The input shaft 1, the output shaft 2 and the second rotor shaft 4 of the second electric motor 12 are arranged coaxially on the first shaft train 21. The three-shaft planetary gear stage 16 of the multistage superposition transmission is arranged on the second shaft train 22. The first rotor shaft 3 of the first electric motor 11 is arranged on a third shaft train 23.

On the first shaft train 21, the outer output shaft 2 encloses the inner input shaft 1 on one side of the transmission housing 25, and the second rotor shaft 4 encloses the input shaft 1 on the other side of the transmission housing 25.

The arrangement of the three-shaft planetary gear stage 16 on the second shaft train allows the use of a sun gear 17 which is small in diameter. This in turn allows a large-magnitude stationary transmission ratio of more than |−4| with a then still acceptably large ring gear 18. Given such a large negative stationary transmission ratio, the simple and therefore narrow planet gears 20 come to have such a size that sufficiently large narrow ball bearings as planet gear bearings are located here. Overall, this leads to a planetary gear stage 16 with an advantageously very short design in the axial direction.

For the kinematic coupling of the elements of the drive system 10 that are distributed on the three shaft trains 21, 22 and 23, use is made of four transmission stages configured as spur gear stages. The input shaft 1 on the first shaft train 21 is connected via a first spur gear stage 31 to a first coupling shaft 5 on the second shaft train 22. The output shaft 2 on the first shaft train 21 is connected via a second spur gear stage 32 to a second coupling shaft 6 on the second shaft train 22. The second rotor shaft 4 of the second electric motor 12 on the first shaft train 21 is connected via a third spur gear stage 33 to a third coupling shaft 7 on the second shaft train 22. This third coupling shaft also carries the sun gear 17. The first rotor shaft 3 of the first electric motor 11 on the third shaft train 23 is connected via a fourth spur gear stage to the ring gear 18 of the planetary gear stage 16 on the second shaft train 22.

The first spur gear stage 31 increases the rotational speed of the input shaft 1 to an approximately three times larger absolute rotational speed of the first coupling shaft 5, which is connected to the second coupling shaft 6 via the planetary gear stage 16. The rotational speed of the second coupling shaft 6 is converted, with the transmission ratio of the second spur gear stage 32, to a rotational speed of the output shaft 2 that is approximately 30% lower. The ratio of the transmission ratios of the first spur gear stage 31 and the second spur gear stage 32, each defined as ratio of the rotational speed of the gear on the second shaft train 22 to the rotational speed of the gear on the first shaft train 21, defines the maximum actuating coupling transmission ratio between the first coupling shaft 5 and the second coupling shaft 6. For a high efficiency profile over the actuating coupling transmission ratio in the actuating range, it is advantageous if the maximum and the minimum actuating coupling transmission ratio are approximately reciprocal. This can be achieved easily with such a design.

On the second shaft train 22, the first coupling shaft 5 is connected to the planet carrier 19, the second coupling shaft 6 is connected to the ring gear 18, and the third coupling shaft is connected to the sun gear 17 of the planetary gear stage 16. Since the first rotor shaft 3 of the first motor 11 is connected to the ring gear 18 and hence to the output shaft 2, the first embodiment variant has output-side power branching.

In FIG. 1 there are marked five arrangement planes 35, 36, 37, 38 and 39 whose number is increased in an axial direction 30. The axial direction 30 points into the transmission housing 25 from the side at which the output shaft 2 exits the transmission housing 25. It is then clearly evident in FIG. 1 that the second spur gear stage 32 is situated in the first arrangement plane 35 and that the planetary gear stage 16 and the fourth spur gear stage 34 are situated in the second arrangement plane 36 which is situated offset parallel to the first arrangement plane 35 in the axial direction 30, and that the first spur gear stage 31 is situated in a third arrangement plane 37 which is also situated offset in the axial direction 30 with respect to the second arrangement plane 36, and that the third spur gear stage 33 is situated in a fourth arrangement plane 38 which is also situated offset in the axial direction 30 with respect to the third arrangement plane 37, and that the two motors 11 and 12 are situated in a fifth arrangement plane 39 which is likewise situated offset in the axial direction 30 with respect to the fourth arrangement plane 38.

The planetary gear stage 16 and the fourth spur gear stage 34 can be situated in the same second arrangement plane 36, because the gear of the fourth spur gear stage 34 on the second shaft train 22 has a larger pitch circle radius than the ring gear 18 of the three-shaft planetary gear stage 16. As a result, the ring gear 18 is located within this gear of the fourth spur gear stage 34 in the second arrangement plane 36.

This axial arrangement of the spur gear stages 31, 32, 33 and 34 in the surroundings of the planetary gear stage 16 on the second shaft train 22 leads, in conjunction with the drive elements being divided according to the invention over the three shaft planes 21, 22 and 23, to an extremely compact multistage superposition transmission 15. This offers decisive preconditions for a competitively lightweight and small drive system 10.

Additionally, it is clarified in FIGS. 1 and 2 that the gear of the first spur gear stage 31 on the first coupling shaft 5 has a larger pitch circle radius than the sun gear 17 on the third coupling shaft 7. Consequently, upon assembly of the drive system 10, the sun gear 17 can be plugged through the gear on the first coupling shaft 5.

For simple assembly of the remaining elements of the drive system 10 and mounting thereof in the transmission housing 25, the transmission housing 25 may include four housing parts. The transmission housing 25 consists of a main housing 26 with a central web 27 which can be or is connected thereto, and a motor covering 28, which can be or is connected to the main housing 26, on the side of the fifth arrangement plane 39, and a transmission covering 29, which can be or is connected to the main housing 26, on the side of the first arrangement plane 35 through which the output shaft 2 projects out of the transmission housing 25.

The construction design depicted in FIG. 2 illustrates possible bearing arrangements of all the shafts of the drive system 10 in the transmission housing 25 or on other shafts. It is the aim here to realize statically determined bearing arrangements with a large bearing spacing and small bearing sizes. These are good preconditions for low-noise and low-loss running of all shafts.

On the first shaft train 21, the input shaft 1 is supported via a first bearing 41 in the output shaft 2 and via a second bearing 42 in the motor covering 28. The input shaft 1 projects on both sides from the transmission housing 25 and experiences high radial loading from the drive. The bearings 41 and 42 have a maximum spacing for optimum mounting of the input shaft 1. The output shaft 2 is supported via a third bearing 43 in the transmission covering 29 and via a fourth bearing 44 on the input shaft. The bearings 41 and 43 are situated approximately radially around one another such that the radial bearing load of bearing 41 is directly supported via bearing 43 in the transmission housing 25.

The first rotor shaft 3 is supported via a fifth bearing 45 in the transmission covering 29 and via a sixth bearing 46 in the motor covering 28. However, the bearing 46 can also be placed with a similarly good function between the central web 27 and the rotor shaft 3.

The second rotor shaft 4 is mounted via a seventh bearing 47 and an eighth bearing 48 on the input shaft 1. However, the bearing 47 can also be seated between the rotor shaft 4 and central web 27, but then has a larger diameter. The bearing 48 could also be seated between rotor shaft 4 and motor covering 28, but that would also require more axial and radial installation space.

On the second shaft train 22, a plurality of shafts are mounted inside one another, but ultimately in the transmission housing 25. The second coupling shaft 6 is the most highly loaded shaft on the second shaft train 22 and is therefore configured as the innermost shaft which is mounted via a ninth bearing 49 in the transmission covering 29 and via a tenth bearing 50 in the central web 27. This results in an advantageously large bearing space. Alternatively, the bearing 50 could even also be seated in the motor cover 28, which would indeed increase the bearing spacing further still but at the expense of the bending stiffness of the second coupling shaft 6.

The third coupling shaft 7 is supported via an eleventh bearing 51 on the second coupling shaft 6 and via a twelfth bearing 52 in the central web 27. The first coupling shaft 5 is supported via a thirteenth bearing 53 on the third coupling shaft 7 and via a fourteenth bearing 54 on the second coupling shaft 6. A fifteenth bearing 55 additionally transmits axial forces between the third coupling shaft 7 and the central web 27, and a sixteenth bearing 56 transmits axial forces between the first coupling shaft 5 and the third coupling shaft 7.

In the first arrangement plane 35 having the second spur gear stage 32 there is situated a freewheel 40 between the input shaft 1 and the output shaft 2. This may be a clamping-body-type freewheel because this design of a freewheel has a high torque capacity and can concomitantly use hardened cylindrical surfaces of the shafts which are to be coupled. However, in the structural configuration according to FIG. 2, the freewheel has a dedicated inner ring and a dedicated outer ring.

It is by all means possible in a bicycle application for a powerful rider to sporadically apply high loads to the input shaft via the crank. Such a thing occurs during strong accelerations and steep uphill riding, that is to say in road situations with a large gear ratio. In these riding situations, the freewheel 40 thus protects the drive system because it directly connects the input shaft 1 to the output shaft 2 in the maximum gear ratio.

If the control in the power controller 8 limits the maximum torque of the second motor 12, an excessive input torque which can no longer be supported via the second motor 12 accelerates the input shaft 1 until the freewheel 40 automatically couples the input shaft 1 to the output shaft 2 in a non-positively locking manner. The freewheel 40 thus serves on the one hand as an overload protector for the drive system and on the other hand ensures a mechanical basic function of the drive in the event of problems in the electric system, for example in the event of a voltage drop, or in the event of problems in the controller/regulator, for example in the event of failure of sensors.

For precise and reliable control of the drive system with a high degree of drive comfort, the controller requires precise signals in short clock times. For this purpose, a first resolver 57 with sensor and encoder wheel for exactly measuring the angular position and the rotational speed is seated on the first rotor shaft 3. A second resolver 58 is seated on the second rotor shaft 4. Moreover, a simple rotational speed measuring system 59 measures the rotational speed of the input shaft 1. The high-precision resolvers 57 and 58 are prerequisites for precise rotational speed and/or torque control on the two motors 11 and 12. The additional and optional rotational speed measuring system 58 on the input shaft allows a certain redundancy for higher system reliability. It can serve for example to check the plausibility of the resolver signals and allows a function-reduced emergency function in the event of failure of a resolver.

In FIG. 2, there is also installed on the transmission housing 25 an acceleration and inclination sensor 24, as is used nowadays for example in many smartphones. The acceleration and inclination signals, in conjunction with the knowledge of the transmitted power, allow conclusions to be drawn on the system weight and the dynamics of the input torque. This information can be used in the power controller for quicker and more comfortable control.

Figure 3:
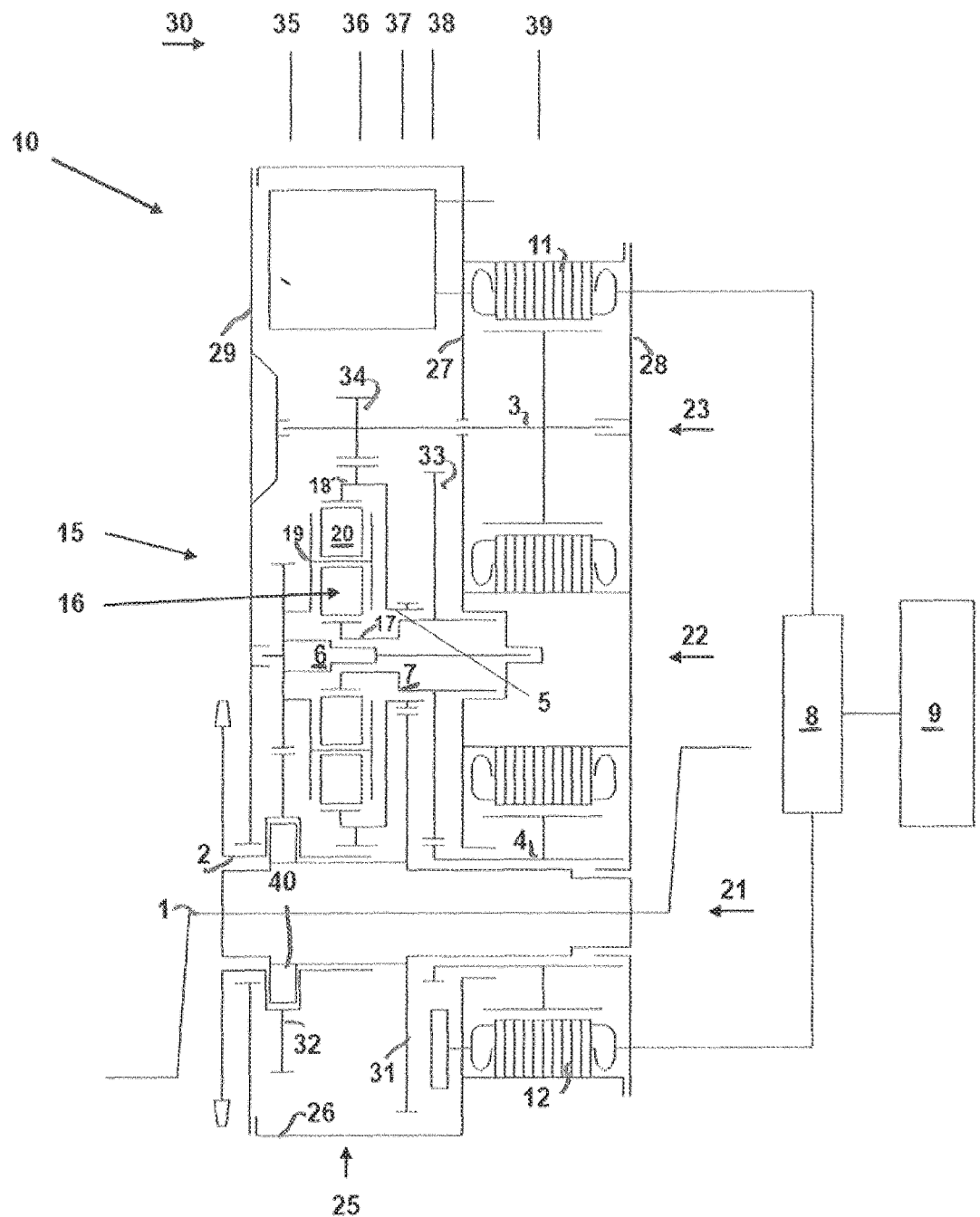
FIG. 3 shows a transmission structure with input-side power branching according to a second embodiment variant of a proposed drive system for application in an electrically assisted bicycle.
Figure 4:
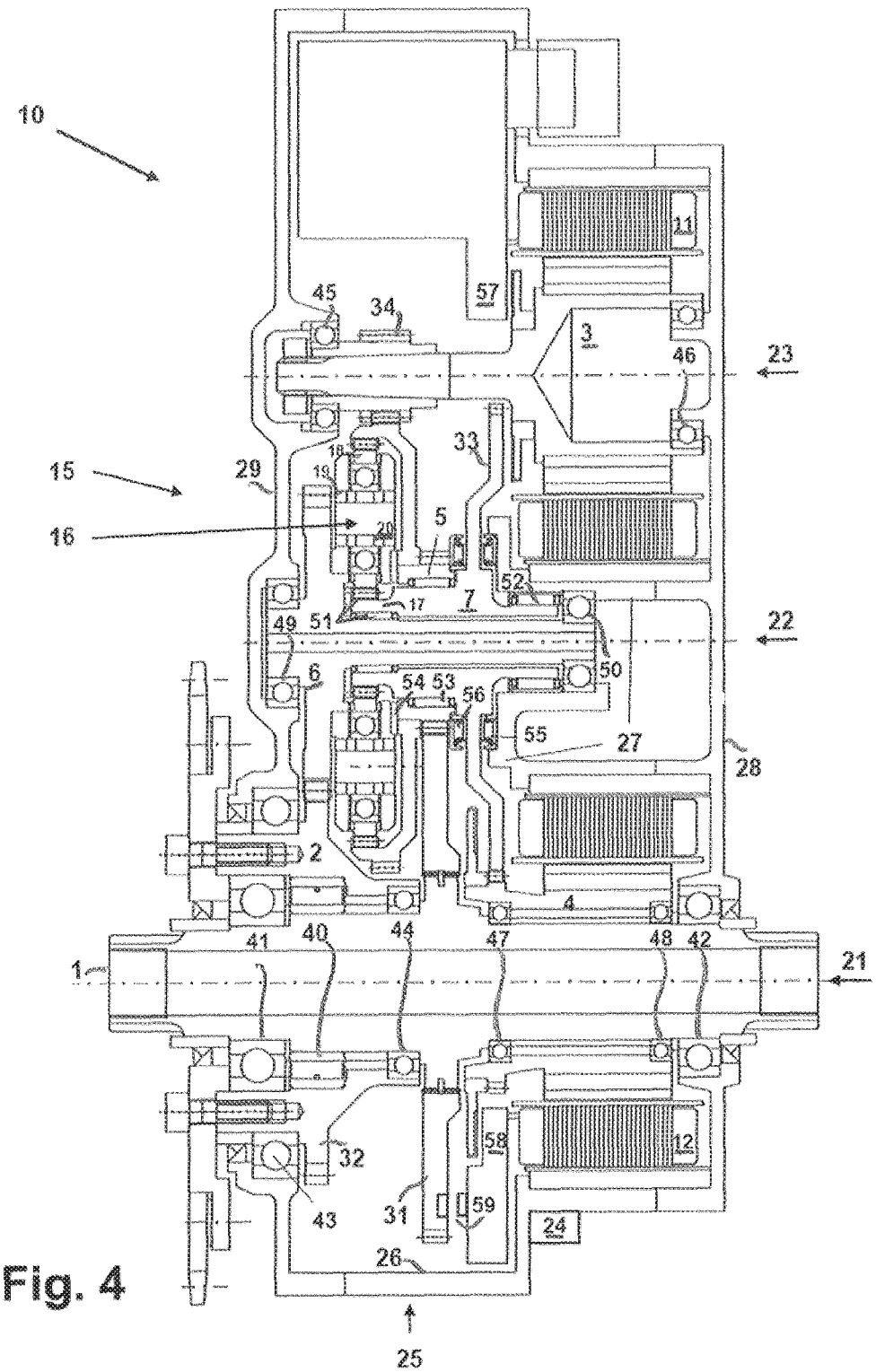
FIG. 4 shows a constructive design of the drive system according to FIG. 3 for illustrating the relative positions of mechanical components such as shafts, transmission stages and bearing arrangements with respect to one another.

FIGS. 3 and 4 show the transmission structure and a 2D construction design of one or more embodiments of the drive system 10 according to the invention between the input shaft 1 and the output shaft 2 in a transmission housing 25 for application in an electrically assisted bicycle.

In one or more embodiments, the first coupling shaft 5 is connected to the planet carrier 9, and the second coupling shaft 6 is connected to the ring gear 18 of the planetary gear stage 20. In one or more embodiments, the first coupling shaft 5 is connected to the ring gear 18, and the second coupling shaft 6 is connected to the planet carrier of the planetary gear stage 20. These are the sole structural differences between the two embodiment variants.

Since the first rotor 3 of the first motor 11 in both embodiment variants is connected to the ring gear 18 via the fourth spur gear stage 34 (transmission ratio in the range of |−8|), the rotational speeds of the output shaft 2 and of the first rotor shaft 3 may be proportional. The rotational speeds of the input shaft 1 and of the first rotor shaft 3 are proportional in one or more embodiments. Both variants are technically expedient. In an electrically assisted bicycle drive, the first embodiment variant is all the more advantageous the higher the electrical assistance, because the electrical assistance power then acts on the driven wheel on a more direct path from the energy accumulator 9 mainly via the first motor 11.

In the structural configuration there thus result only minimum differences in terms of the mounting of the three coupling shafts inside one another. This mainly concerns the configurations of the bearings 51 and 54.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Input shaft
2 Output shaft
3 First rotor shaft
4 Second rotor shaft
5 First coupling shaft
6 Second coupling shaft 7 Third coupling shaft
8 Power controller
9 Energy accumulator (battery or pressure accumulator)
10 Drive system
11 First (electric or hydraulic) motor
12 second (electric or hydraulic) motor
13 First stator
14 Second stator
15 Superposition transmission
16 Three-shaft planetary gear stage PG
17 Sun gear
18 Ring gear
19 Planet carrier
20 Planet gears
21 First shaft train
22 Second shaft train
23 Third shaft train
24 Acceleration and inclination sensor
25 Transmission housing
26 Main housing
27 Central web
28 Motor covering
29 Transmission covering
30 Axial direction
31 First spur gear stage
32 Second spur gear stage
33 Third spur gear stage
34 Fourth spur gear stage
35 First arrangement plane
36 Second arrangement plane
37 Third arrangement plane
38 Fourth arrangement plane
39 Fifth arrangement plane
40 Freewheel
41 First bearing
42 Second bearing
43 Third bearing
44 Fourth bearing
45 Fifth bearing
46 Sixth bearing
47 Seventh bearing
48 Eighth bearing
49 Ninth bearing
50 Tenth bearing
51 Eleventh bearing
52 Twelfth bearing
53 Thirteenth bearing
54 Fourteenth bearing
55 Fifteenth bearing
56 Sixteenth bearing
57 First resolver with sensor and encoder wheel
58 Second resolver with sensor and encoder wheel
59 Rotational speed measuring system While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:
1. A drive system comprising
a transmission housing;
an input shaft;
an output shaft;
a first motor including a first rotor shaft;
a second motor including a second rotor shaft;
a multistage superposition transmission connecting the input shaft and the output shaft to the first rotor shaft and to the second rotor shaft, and including a planetary gear stage provided with a sun gear, a ring gear, and a planet carrier provided with a plurality of planet gears;
a power controller operatively coupling the first motor and the second motor to form a continuously variable actuating mechanism; and
an energy accumulator connected to the first motor and the second motor;
wherein the input shaft, the output shaft, and the second rotor shaft are arranged coaxially on a first shaft train,
wherein the multistage superposition transmission forms a three-shaft planetary gear stage arranged on a second shaft train parallel to the first shaft train, and
wherein the first rotor shaft is arranged on a third shaft train parallel to the first shaft train and the second shaft train;
a first coupling shaft disposed on the second shaft train;
a first spur gear stage connecting the input shaft to the first coupling shaft;
a second coupling shaft disposed on the second shaft train;
a second spur gear stage connecting the output shaft to the second coupling shaft;
a third coupling shaft disposed on the second shaft train and connected to the sun gear;
a third spur gear stage connecting the second rotor shaft to the third coupling shaft; and
a fourth spur gear stage connecting the first rotor shaft and to the ring gear, wherein the ring gear is disposed on the second shaft train.

2. The drive system of claim 1, wherein the first coupling shaft is connected to the planet carrier and the second coupling shaft is connected to the ring gear.

3. The drive system of claim 1, wherein, the first coupling shaft is connected to the ring gear and the second coupling shaft is connected to the planet carrier.

4. The drive system of claim 1, wherein the second spur gear stage is disposed in a first arrangement plane and the planetary gear stage and the fourth spur gear stage are each disposed in a second arrangement plane parallel to the first arrangement plane wherein the second arrangement plane is offset in an axial direction from the first arrangement plane wherein the output shaft extends in the axial direction.

5. The drive system of claim 4, wherein the fourth spur gear stage includes a gear defining a first pitch circle radius and the ring gear defines a second pitch circle radius, wherein the first pitch circle radius is greater than the second pitch circle radius.

6. The drive system of claim 5, wherein a gear of the first spur gear stage is disposed on the first coupling shaft and defines a third pitch circle radius, wherein the sun gear defines a fourth pitch circle radius, and the third pitch circle radius is greater than the fourth pitch circle radius.

7. The drive system of claim 4, wherein the transmission housing includes a main housing provided with a central web, a motor cover connected to the main housing, and a transmission cover connected to the main housing, wherein the first and second motors are situated in a fifth arrangement plane, and wherein the motor cover and the fifth arrangement plane are each disposed on a first side of the transmission housing, and the transmission cover and the first arrangement plane is disposed on a second side of the transmission housing, and the output shaft projects out of the transmission housing.

8. The drive system of claim 4, wherein the first spur gear stage is disposed in a third arrangement plane axially offset with respect to the second arrangement plane.

9. The drive system of claim 8, wherein the third spur gear stage is disposed in a fourth arrangement plane axially offset in the axial with respect to the third arrangement plane.

10. The drive system of claim 9, wherein the first motor and the second motor are disposed in a fifth arrangement plane axially offset with respect to the fourth arrangement plane.

11. The drive system of claim 1, wherein the transmission housing includes a main housing provided with a central web, a motor cover connected to the main housing, and a transmission cover connected to the main housing.

12. A drive system comprising
a transmission housing including a main housing provided with a central web, a motor cover connected to the main housing, and a transmission cover connected to the main housing;
an input shaft;
an output shaft projecting out of the transmission housing;
a first motor including a first rotor shaft;
a second motor including a second rotor shaft;
a multistage superposition transmission connecting the input shaft and the output shaft to the first rotor shaft and to the second rotor shaft, and including a planetary gear stage provided with a sun gear, a ring gear, and a planet carrier provided with a plurality of planet gears;
a power controller operatively coupling the first motor and the second motor to form a continuously variable actuating mechanism; and
an energy accumulator connected to the first motor and the second motor,
a first bearing disposed in the output shaft;
a second bearing disposed in the motor cover, wherein the input shaft projects from a first side of the transmission housing to a second side of the transmission housing and the first bearing and the second bearing support the input shaft; and
a third bearing disposed in the transmission cover; and
a fourth bearing disposed on the input shaft, wherein the third bearing and the fourth bearing each support the output shaft;
wherein the input shaft, the output shaft, and the second rotor shaft are arranged coaxially on a first shaft train,
wherein the multistage superposition transmission forms a three-shaft planetary gear stage arranged on a second shaft train parallel to the first shaft train, and
wherein the first rotor shaft is arranged on a third shaft train parallel to the first shaft train and the second shaft train.

13. The drive system of claim 12, further comprising:
a fifth bearing disposed in the transmission cover; and
a sixth bearing disposed in either the central web or the motor cover, wherein the fifth bearing and the sixth bearing each support the first rotor shaft.

14. The drive system of claim 13, further comprising:
a seventh bearing disposed on the output shaft or in the central web; and
an eighth bearing disposed on the input shaft or in the motor cover, wherein the second rotor shaft is mounted to the output shaft or the central web by the seventh bearing and to the central web or the motor cover by the eighth bearing.

15. The drive system of claim 14, further comprising:
a first coupling shaft disposed on the second shaft train;
a second coupling shaft disposed on the second shaft train;
a third coupling shaft disposed on the second shaft train and connected to the sun gear;
a ninth bearing disposed in the transmission cover;
a tenth bearing disposed in the central web or the motor cover, wherein the second coupling shaft is mounted to the transmission cover by the ninth bearing and to the motor cover or the central web by the tenth bearing;
an eleventh bearing disposed on the second coupling shaft;
a twelfth bearing disposed in the central web, wherein the third coupling shaft is supported by the eleventh bearing and the twelfth bearing;
a thirteenth bearing disposed on the third coupling shaft; and
a fourteenth bearing disposed on the second coupling shaft wherein the first coupling shaft is supported by the thirteenth bearing and the fourteenth bearing;
a fifteenth bearing configured to transmit axial forces between the third coupling shaft and the central web; and
and a sixteenth bearing configured to transmit axial forces between the first coupling shaft and the third coupling shaft.

16. A drive system comprising:
a transmission housing including a main housing provided with a central web, a motor cover connected to the main housing, and a transmission cover connected to the main housing;
an input shaft;
an output shaft;
a first motor including a first rotor shaft;
a second motor including a second rotor shaft;
a multistage superposition transmission connecting the input shaft and the output shaft to the first rotor shaft and to the second rotor shaft, and including a planetary gear stage provided with a sun gear, a ring gear, and a planet carrier provided with a plurality of planet gears;
a power controller operatively coupling the first motor and the second motor to form a continuously variable actuating mechanism;
a first bearing supported by the output shaft;
a second bearing supported by the motor cover;
a freewheel disposed between the first bearing and the second bearing and between the input shaft and the output shaft, wherein the freewheel is configured to prevent the input shaft from rotating quicker than the output shaft; and
an energy accumulator connected to the first motor and the second motor;
wherein the input shaft, the output shaft, and the second rotor shaft are arranged coaxially on a first shaft train,
wherein the multistage superposition transmission forms a three-shaft planetary gear stage arranged on a second shaft train parallel to the first shaft train, and
wherein the first rotor shaft is arranged on a third shaft train parallel to the first shaft train and the second shaft train.

17. A drive system comprising
a transmission housing;
an input shaft;
an output shaft;
a first motor including a first rotor shaft;
a second motor including a second rotor shaft;

a multistage superposition transmission connecting the input shaft and the output shaft to the first rotor shaft and to the second rotor shaft, and including a planetary gear stage provided with a sun gear, a ring gear, and a planet carrier provided with a plurality of planet gears;

a power controller operatively coupling the first motor and the second motor to form a continuously variable actuating mechanism;

an energy accumulator connected to the first motor and the second motor;

a first resolver provided with a sensor and an encoder wheel disposed on either the first rotor shaft or the second rotor shaft and configured to cooperate to measure an angular position and a rotational speed of either the first rotor shaft or the second rotor;

a rotational speed sensor disposed on the input shaft; and an acceleration sensor or an inclination sensor disposed on the transmission housing;

wherein the input shaft, the output shaft, and the second rotor shaft are arranged coaxially on a first shaft train, wherein the multistage superposition transmission forms a three-shaft planetary gear stage arranged on a second shaft train parallel to the first shaft train, and wherein the first rotor shaft is arranged on a third shaft train parallel to the first shaft train and the second shaft train.

* * * * *